United States Patent
Löytty (10) Patent No.: US 10,830,108 B2
(45) Date of Patent: Nov. 10, 2020

(54) METHOD AND APPARATUS FOR UTILIZING THE WASTE HEAT OF COMBUSTION GASES OF AN INTERNAL COMBUSTION ENGINE

(71) Applicant: Systematic Power, Pieksämäki (FI)

(72) Inventor: Ari Löytty, Hankasalmi (FI)

(73) Assignee: Systematic Power, Pieksämäki (FI)

( * ) Notice: Subject to any disclaimer, the term of this patent is extended or adjusted under 35 U.S.C. 154(b) by 0 days.

(21) Appl. No.: 15/972,268

(22) Filed: May 7, 2018

(65) Prior Publication Data
US 2018/0334927 A1 Nov. 22, 2018

(30) Foreign Application Priority Data
May 17, 2017 (FI) .................................... 20170075

(51) Int. Cl.
*F01K 23/06* (2006.01)
*F01K 23/10* (2006.01)
(Continued)

(52) U.S. Cl.
CPC ............ *F01K 23/10* (2013.01); *F01K 23/065* (2013.01); *F01N 3/0205* (2013.01); *F01N 5/02* (2013.01);
(Continued)

(58) Field of Classification Search
CPC . F01N 3/0205; F01N 5/02; F01N 5/04; F01N 2240/02; F01N 2590/02;
(Continued)

(56) References Cited

U.S. PATENT DOCUMENTS 3,673,797 A * 7/1972 Wilkinson ............ F02B 37/105
60/600
6,170,474 B1 * 1/2001 Israel ...................... F02D 13/04
123/568.14
(Continued)

FOREIGN PATENT DOCUMENTS

GB 2559176 A 8/2018
WO WO-2018138314 A1 * 8/2018 ............... F01N 5/00

OTHER PUBLICATIONS

Legros et al: Comparison and Impact of Waste Heat Recovery Technologies on Passenger Car Fuel Consumption in a Normalized Driving Cycle. Energies, vol. 7(8), 2014, pp. 5273-5290.
(Continued)

*Primary Examiner* — Audrey K Bradley
(74) *Attorney, Agent, or Firm* — Laine IP Oy (57) ABSTRACT

A method and apparatus for utilizing the waste heat of combustion gases of an internal combustion engine, wherein the combustion gases are directed to a first turbine, a subsequent second turbine, and a precooling heat exchanger with water separation. Whereby the combustion gases formed as a result of combustion of air and fuel in a cylinder of the internal combustion engine according to an Electric Turbo Compounding (ETC) system are expanded after the first turbine to a pressure of less than 0.45 bar in the second turbine, and wherein said first turbine is connected by a shaft to a combustion gas compressor that pressurizes the combustion gases from the precooling heat exchanger to atmospheric pressure.

25 Claims, 8 Drawing Sheets

(51) Int. Cl.
*F01N 3/02* (2006.01)
*F01N 5/02* (2006.01)
*F01N 5/04* (2006.01)
*F02B 37/00* (2006.01)
*F02B 37/013* (2006.01)
*F02B 39/10* (2006.01)
*F02B 41/10* (2006.01)

(52) U.S. Cl.
CPC .............. *F01N 5/04* (2013.01); *F02B 37/004* (2013.01); *F02B 37/013* (2013.01); *F02B 39/10* (2013.01); *F02B 41/10* (2013.01); *F01N 2240/02* (2013.01); *F01N 2590/02* (2013.01); *F01N 2590/10* (2013.01); *F01N 2590/11* (2013.01)

(58) Field of Classification Search
CPC ............. F01N 2590/10; F01N 2590/11; F01K 23/065; F01K 23/10; F02B 37/004; F02B 37/013; F02B 39/10; F02B 41/10
See application file for complete search history.

(56) References Cited

U.S. PATENT DOCUMENTS

2008/0121218 A1* 5/2008 Algrain ................. F02B 37/013
123/565

2014/0250906 A1* 9/2014 Loytty .................... F01K 23/10
60/775
2018/0371954 A1* 12/2018 Copeland .............. F01K 21/045

OTHER PUBLICATIONS

National Research Council et al: Power Train Technologies for Reducing Load-Specific Fuel Consumption. Technologies and Approaches to Reducing the Fuel Consumption of Medium- and Heavy-Duty Vehicles, Jul. 30, 2010, pp. 52-53.
Pasini et al: Electric Turbo Compounding Applied to a CI Engine: A Numerical Evaluation of Different Layouts. ASME 2016 Internal Combustion Engine Division Fall Technical Conference, Greenville, South Carolina, Oct. 9, 2016.
Takai et al: Study of an EGR System for Downsizing Turbocharged Gasoline Engine to Improve Fuel Economy. SAE Technical Paper, Apr. 1, 2014, pp. 1-8.
Wikipedia contributors: Atkinson cycle. Wikipedia. The Free Encyclopedia, Jul. 14, 2018, Retrieved Jul. 31, 2018.
Wikipedia contributors: Brayton cycle. Wikipedia, The Free Encyclopedia, Jul. 18, 2018, Retrieved Jul. 31, 2018.

* cited by examiner

METHOD AND APPARATUS FOR UTILIZING THE WASTE HEAT OF COMBUSTION GASES OF AN INTERNAL COMBUSTION ENGINE

The present invention relates to a method and apparatus for utilizing the waste heat of combustion gases of an internal combustion engine.

Waste heat is high-temperature heat and the main subjects are medium-sized engine power plants, marine diesel engines and hybrid cars. From the internal combustion engine the combustion gases are directed to the first turbine, subsequent to which a second turbine is provided in which the combustion gases continue expanding in a pressure at least partly below the atmospheric pressure—typically to a pressure of about 0.2 to 0.45 bar (even a lower pressure is possible), i.e. to a pressure below the intake pressure of the cylinder of an internal combustion engine. This second turbine is in fact a turbine-compressor combination. The said compressor part compresses combustion gases back to atmospheric pressure. The compression is made in one stage or two stages and there is a intercooler between the stages for reasons disclosed later in the text. Prior to this the combustion gases have been cooled by means of a precooling heat exchanger to near the temperature of the cooling medium—typically air or water. Thereby the water vapour formed during combustion is also removed from the process prior to the combustion gas compressor. It is connected by a shaft to the second turbine and the second combustion gas compressor is connected by a shaft to the first turbine and the second combustion gas turbine is connected to the first turbine by a shaft. Alternatively the shaft connection can in theory be made also the other way round. The net work of both shafts is positive so generators are connected to them. A single-part combustion gas compressor construction is also possible. Additionally, water vapour may be introduced into the exhaust manifold of an internal combustion engine, if desired.

In the most competitive applications, the produced power is utilized by means of a generator in, for example, hybrid cars, medium-sized engine power plants or marine traffic (electrically driven propeller). In hybrid cars the power available from the internal combustion engine can be conventionally utilized or it can be recovered through the car's generator and the total electricity produced can be utilized in the electric motor. Current internal combustion engines utilize, in a small scale, the waste energy of combustion gases. This is called electric turbo compounding and such engines are already in serial production. In such a system only the overpressure formed as a result of the combustion is utilized. Thermodynamically this overpressure is a result of combustion taking place in constant volume. Because in a diesel engine the combustion is slower and thus shows a more constant pressure, the pressure of the combustion gases at the outlet of the exhaust valves is, at least theoretically, lower. Another factor causing overpressure is the pressurization of air entering the engine by means of a so-called turbo, i.e. if current engines are equipped with a turbo, a higher overpressure is achieved.

Such an arrangement can often be found in e.g. diesel engines where EGR (Exhaust Gas Recirculation) is often used. In one of the most advanced EGR-systems a slight vacuum, so-called intake pressure into which a portion of the combustion gases is recirculated, is formed in the cylinder of the internal combustion engine during the intake stroke. Thus the inlet pressure defines the lowest pressure occurring in the system. The values found in literature specify a maximum inlet pressure of 0.847 bar overpressure or a vacuum of 0.54 bar. By using an additional 40% certainty the above-mentioned EGR vacuum is 0.458 bar. In the Electric Turbo Compounding system according to the invention the expansion of the combustion gases is not related to the inlet pressures of the cylinder of the internal combustion engine and thus the combustion gases of an ETC system expand to below the inlet pressure of the cylinder, i.e. below the pressure of 0.45 bar, from 0.2 to 0.45 bar for example, wherein the lower limit by certainty means a pressure lower than the inlet pressure of the cylinder of the internal combustion engine. The main goal of EGR is not to improve efficiency, but it relates to reduction of NOx as described later. Thus the present invention allows improving of the efficiency when compared to existing inventions by expanding the exhaust gases in the turbine below the inlet pressure of the internal combustion engine. This is an essential difference to the existing solutions, i.e. that expansion is not related to the inlet pressure of the cylinder of the internal combustion engine. In other words, the combustion gases expand in the turbine regardless of the inlet pressures of the cylinder of the internal combustion engine.

According to the inventive ETC system, in the heat exchanger 5 only water vapour formed in combustion is taken out from the circulation process. No nitrogen is removed before the exhaust gas compressor 6, because no nitrogen circulation back to the engine is necessary. Differently from this, in the known EGR system that utilize the waste heat of exhaust gases, efficiency may be increased as part of the nitrogen need not be compressed with an exhaust gas compressor, resulting in a better fuel economy.

Because in a system according to the invention the combustion gases expand in a turbine to a pressure of e.g. 0.2 bar, the use of a two-part turbine is advantageous and it is thus an essential/innovative difference to existing inventions. Thus in a system according to the invention e.g. in the technology using a table-based valve timing, the combustion gases expand in the engine to a pressure lower than normal and the main part of the inventive ETC expansion of the exhaust gases takes place in a pressure below 1 atm.

EGR is thus based on the fact that a portion of the combustion gases is branched and recycled to the inlet pressure of the cylinder. An example of an EGR publication is a publication by Nissan in 2014 at the SAE World Congress & Exhibition, "Study of an EGR System for Downsizing Turbocharged Gasoline Engine to Improve Fuel Economy". According to the study a low-pressure EGR allows for a 5% saving in fuel economy, while the enclosed invention allows a fuel consumption saving of 25% to 30% or even more. In other words, EGR means exhaust gases recirculation and is a method of utilizing combustion gases. According to the book "Technologies and approaches to reducing the fuel consumption of medium- and heavy-duty vehicles" published in the 2010's, such methods include "mechanical turbocompounding, electric turbocompounding (ETC), variable valve actuation (VVA) and advanced EGR cooling" (p. 52-53). Each of these are separate innovations, such as e.g. the internal combustion engine, gas turbine, Rankine process, fuel cell, Stirling engine etc., all being producers of motive power, but each of them a separate invention. The purpose of EGR is to lower NOx emissions by lowering the combustion temperature by feeding a portion of the combustion gases back to the engine. In an ETC system according to the invention, on the other hand, current temperatures is a minimum target. On the average, EGR has a ±3% effect on efficiency, but larger differences have been seen.

As can be seen from FIGS. 1 to 8, in the present invention there is no branch in the combustion gas circulation from the minimum pressure of the turbine circulation, or subsequently from the combustion gas compressor (1 atm) to the inlet pressure of the cylinder of the internal combustion engine, because the method according to the present invention allows efficient utilization of the waste energy of the combustion gases by expanding the combustion gases into, for example, pressure of the mentioned 0.2 bar, which with certainty represents a pressure lower than the inlet pressure of the cylinder based on the above description. However, this value is just an example, and an optimal expansion range is disclosed later in this application. Recirculating combustion gases is thus not typical or necessary for the present invention. This is an essential difference to EGR systems as they would not exist without combustion gas recirculation.

In a method according to the invention the pressure ratio of the turbine can be greatly increased by also integrating it with the internal combustion engine so that the exit temperature of the combustion gases from the internal combustion engine is about 600 to 800 degrees Celsius. This means either a higher maximum temperature of combustion in the cylinder or a phased combustion in the cylinder. In a parallel hybrid, increased utilization of the generator during low power demand would keep the total power relatively constant, and in a series hybrid a constant total power is even more simple to realize.

One new idea of the invention is that the use of an inverted Brayton process, even though it is used in refrigerating apparatuses, will allow achieving about 30% fuel saving/improved efficiency in a hybrid car. One of the publications of the industry is "Comparison and Impact of Waste Heat Recovery Technologies on Passenger Car Fuel Consumption in a Normalized Driving Cycle". This is a publication from 2014. It also mentions Electric Turbo Compounding, but it instead of a fuel saving of 30% is discloses a fuel saving of about 10% maximum, that value being also disclosed in the ETC appendices of Wikipedia.

In one of the embodiments, the above-mentioned problem of the maximum temperature of the combustion gas compressor being too high in relation to the minimum of the turbine temperature, is solved by means of a two-stage combustion gas compressor and by arranging an intercooler between the stages. This means power saving and a lower maximum temperature in the combustion gas compressor, whereby the minimum temperature of the turbine can be lowered, if necessary, and the pressure ratio of the turbine be increased. This allows for a minimum pressure as low as 0.1 to 0.2 bar. The high turbine pressure ratio in turn makes it possible in the invention to effectively utilize the largest loss. In a method according to the invention, preheated and vaporized water is introduced into the exhaust manifold or combustion chamber 10 of an internal combustion engine. The maximum amount of introduced water is set to 25%, with the minimum naturally being 0%: The preheating and vaporization of water is carried out by means of the waste heat from the second turbine, the waste heat being the above-mentioned largest heat loss.

Because of the number of simultaneously used methods described above facilitates a high total pressure ratio of the turbines, water vapour will greatly increase the total power of the system. If there is an afterburner/combustion chamber prior to the first turbine, the temperature of the combustion gases entering the first turbine can be increased. In this case it is very advantageous to utilize an additional embodiment of the invention, i.e. an early opening of the valves of the internal combustion engine, which increases the pressure ratio of the turbine. In this case the maximum pressure of the combustion gases exiting the internal combustion engine can be in the range 3-4 bar. In the figure in which the water introduced into the exhaust manifold is the minimum, i.e. zero, it is advantageous to utilize another additional embodiment of the invention, i.e. opposite valve timing. This yields an expansion ratio larger than the compression ratio of the internal combustion engine, which allows achieving a lower minimum pressure of the second turbine with the same exhaust valve temperature. This also allows achieving about 30% additional power with the values described in table 1.

TABLE 1

|    | p (bar) | T (K) | h(N2) kJ/kg | h(O2) kJ/kg | h(CO2) kJ/kg | h(H2O) kJ/kg |
|----|---------|-------|-------------|-------------|--------------|--------------|
| 21 | 1.0     | 288   | 15.6        | 12.6        |              |              |
| 22 | 1.345   | 980.1 | 769.4       | 711.3       | 756.3        | 3942         |
| 23 | 0.538   | 812.7 | 577.7       | 531.6       | 554.4        | 3569         |
| 24 | 0.224   | 675.3 | 428         | 388.6       | 397.1        | 3277         |
| 25 | 0.221   | 313.0 |             |             |              |              |
| 26 | 0.221   | 313.0 | 41.6        | 35.8        | 36           |              |
| 27 | 0.221   | 313.0 | 41.6        | 35.8        | 36           |              |
| 28 | 1.0     | 403.4 | 135.9       | 120.3       | 113.6        |              |
| 31 | 0.475   | 403.4 | 135.9       | 120.3       | 113.6        |              |
| 32 | 0.466   | 313   | 41.6        | 35.8        | 36           |              | where h(x) is the enthalpy for the matter x in kilojoule per kilo.

If water is not introduced into the exhaust manifold, compressing the inlet air does not necessarily provide advantages—possible the reverse. This applies to applications in which the minimum pressure is of the order of 0.2 to 0.35 bar. This is due to the fact that if inlet air is not compressed and intercooled, the initial temperature of the combustion is higher, which is thermodynamically advantageous. Compressing the inlet air is useful in e.g. applications having an additional combustion prior to the first turbine or water injection into the exhaust manifold. The method can be used in both diesel and otto cycle engines.

In practice, if the combustion gases come from the engine at a pressure of about two bar, the advantage achieved by means of the invention without valve timing technology may be smaller than in the most competitive embodiments. These embodiments are the utilization of the combustion gases of a turbocharged (otto or diesel) internal combustion engine, provided with additional combustion and water injection, and utilizing valve timing in an application. Its use in another embodiment has been thoroughly disclosed earlier. In one embodiment, in which water is not introduced into the exhaust manifold, it means for example that with current hybrid cars that utilize the Atkinson invention from the early 20th century, wherein the compression volume of the cylinder is in practice smaller than the expansion volume and the combustion gases expand to the lower pressure in the cylinder, when the same outlet temperature and with an apparatus and method according to the invention, a combustion gas compressor having a higher pressure ratio and smaller minimum pressure can be used to extract more power from the generator.

It is useful to design the combustion event of an internal combustion engine so that the temperature of the combustion gases is relatively high as they exit the engine. This can be achieved e.g. by means of injecting a small amount of additional fuel at the beginning of the combustion. This increases the average heat import temperature during the combustion process, in comparison to combustion gases exiting the engine in a lower temperature. According to a Carnot process theory, a higher heat import temperature also means a higher efficiency. However, this requires expansion to a pressure of about 0.2 to 0.35 in another turbine. Thereby water vapour formed in combustion is condensed in a lower temperature, whereby the energy loss is smaller. It is just as possible that no additional injection of fuel is needed. On the other hand the additional injection can also be effected before the first turbine or at the end of the actual combustion stage in the cylinder.

According to a first aspect of the invention there is disclosed a method for utilizing the waste heat of combustion gases of an internal combustion engine, in which method the combustion gases circulate, without branching, into the first turbine and a subsequent second turbine, feed water evaporator, precooling heat exchanger with its water separation and a combustion gas compressor. The combustion gases formed as a result of combustion of air and fuel in the cylinder of an internal combustion engine and the cylinder of an internal combustion engine (1) of the advanced Electric Turbo Compounding (ETC) system are expanded in the second turbine after the first turbine to a pressure below 0.45 bar. The combustion gas compressor pressurize the combustion gases back to atmospheric pressure.

The various embodiments of the invention can be characterized by one or more of the following points:
- a feed water vaporizer located between the second turbine and the precooling heat exchanger (5), vaporized feed water and introduces it into the exhaust manifold of the internal combustion engine
- preheating natural gas or gasified coal with the waste heat of the combustion gas compressor or with waste heat from a second turbine
- the heat from a precooling heat exchanger and/or a heat exchanger after the second combustion gas compressor is utilized for district heating, heating the cabin of cars or the like
- air entering the internal combustion engine is compressed by means of a compressor, such as a mechanical or electrical compressor
- air entering the internal combustion engine is compressed by means of a compressor, such as a mechanical or electrical compressor, or air entering the internal combustion engine is not compressed
- the water vapour formed in combustion is removed from the process prior to the first exhaust gas compressor
- fuel is introduced in one or more steps into each cylinder of the internal combustion engine
- a first turbine is connected to a second combustion gas compressor and a second turbine is connected to a combustion gas compressor by a shaft, the first and second turbine being on the same shaft or the combustion gas compressor being connected to the first turbine by a shaft
- connecting a first generator to a first turbine and/or a second generator to a second turbine, the electricity produced therewith being utilized in a hybrid car, as a power source of a ship or in production of electricity
- before a first turbine, an additional combustion is made in the cylinders of the internal combustion engine or in the afterburner/combustion chamber, or there is no combustion chamber
- utilizing the heat between a precooling heat exchanger and a second turbine in the water vapour circulation process
- the temperature of the combustion gases from the internal combustion engine is adjusted by means of valve timing
- there is an on/off intermediate port at a pressure of 1 atm in the combustion gas channel
- the mass flow of the water introduced into the exhaust manifold is from 0 to 25% of the mass flow of the combustion gases
- a battery is used for storing energy
- a pump is used for introducing water into the feed water vaporizer
- the combustion gas compressor is a two-stage compressor or it forms one integrated single-compressor assembly, formed by the said combustion gas compressor and a second combustion gas compressor
- the combustion gases from the internal combustion engine are pressurized with the two-stage combustion gas compressor back to atmospheric pressure, and an intercooler is located between the combustion gas compressor and the second combustion gas compressor
- the internal combustion engine is an otto or a diesel engine According to a second aspect of the invention there is disclosed an apparatus for utilizing the waste heat from an internal combustion engine, the apparatus having an advanced ETC circulation of internal combustion engine exhaust gases. The circulation consists of:
- a first turbine for receiving combustion gases from the internal combustion engine;
- a second turbine for receiving combustion gases from said first turbine;
- a precooling heat exchanger for receiving combustion gases from said first turbine; and
- a combustion gas compressor for receiving combustion gases from said precooling heat exchanger.

The combustion gases formed as a result of combustion of air and fuel in the cylinder of an internal combustion engine and an internal combustion engine connected with the advanced Electric Turbo Compounding (ETC) system are expanded after a first turbine in a second turbine to a pressure below 0.45 bar. A feed water vaporizer may be used to introduce water into the exhaust manifold of the internal combustion engine, and the combustion gases from the combustion gas compressor are introduced to an intercooler and to a second combustion gas compressor, which pressurize the combustion gases back to atmospheric pressure.

Various embodiments of the invention are characterized by what is disclosed in the appended claims.

The different embodiments of the invention are disclosed in the following in more detail with reference to the appended drawings, in which.

Figure 1:
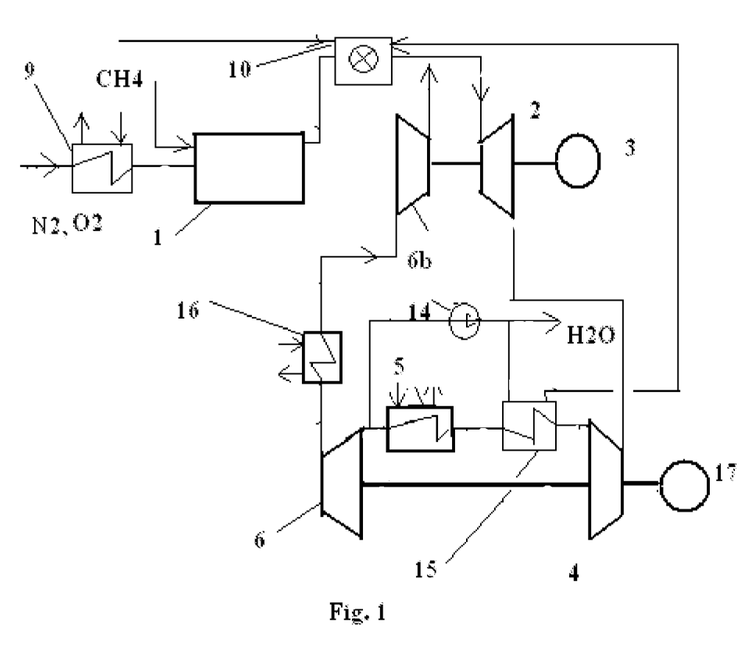
FIG. 1 illustrates an embodiment according to the invention in which the waste heat of the combustion gases is used for vaporizing the water introduced into the exhaust manifold of the internal combustion engine.

In a solution according to FIG. 1 the combustion air entering the internal combustion engine is compressed by means of a mechanical or electrical compressor or a turbocharger. In the example of the figure the internal combustion engine is a diesel engine and the system comprises an afterburner/combustion chamber 10. In all figures, a single-stage combustion gas compressor is shown with reference number 6, which is also used for the first compressor stage of a twin-stage compressor, and the reference number used for the second combustion gas compressor is 6b. Table 2 illustrates the values of the state points of FIG. 1.

TABLE 2

| | p (bar) | T (K) | h(N2) kJ/kg | h(O2) kJ/kg | h(CO2) kJ/kg | h(H2O) kJ/kg |
|---|---|---|---|---|---|---|
| 21 | 2.4 | 313 | 41.6 | 35.8 | | |
| 22 | 5.7 | 826.2 | 593 | 546 | 570.3 | 3598 |
| 23 | 1.1 | 809 | 573.9 | 527.7 | 550 | 3561 |
| 24 | 0.22 | 586.3 | 329.1 | 298.3 | 298.9 | 3092 |
| 25 | 0.211 | 313 | | | | 170 |
| 26 | 0.211 | 313 | 41.6 | 35.8 | 36 | |
| 27 | 0.211 | 313 | 41.6 | 35.8 | 36 | |
| 28 | 1.0 | 405.2 | 137.7 | 122 | 115.3 | |
| 30 | 5.6 | 1100 | 910.3 | 842.9 | 905.4 | 4220 |
| 31 | 0.464 | 405.2 | 137.7 | 122 | 115.3 | |
| 32 | 0.455 | 313 | 41.6 | 35.8 | 36 | |
| 33 | 5.8 | 313 | | | | 172 |
| 34 | 5.7 | 561.3 | | | | 3038 |
| 35 | 0.216 | 338 | 67.6 | 59 | 52.7 | 2615 |

Due to oil scraper rings and lubrication, there is a maximum amount of water that can be injected into the inlet air. Because of this, water is introduced into a combustion chamber 10 in the construction according to FIG. 1. This construction is probably the most competitive in medium-sized and large internal combustion engines in ships and power production, but other applications are possible as well. A diesel engine running on natural gas is chosen as an example. A diesel engine utilizes inlet air compression and cooling to avoid too high an air temperature at the end of compression stroke. In this version a maximum pressure ratio of the turbines is targeted, and therefore valve timing is opposite to that in the technology utilizing the Atkinson invention, shown in FIG. 3. Thus the exhaust valves open slightly earlier than in a normal diesel engine in the example case of the table. Thereby the compression ratio is higher than the expansion ratio.

The air from a mechanical compressor (supercharger), an electrical compressor or a turbocharger goes into an inlet air intercooler 9. Subsequent to this the fuel is combusted in the combustion air of an internal combustion engine 1, after which the combustion gases are passed into the afterburner/combustion chamber 10, in which their temperature is increased as the fuel introduced there is combusted in the remaining oxygen of the combustion gases. If the combustion gases contain no oxygen, additional oxygen can be taken from e.g. the compressed inlet air before the inlet air intercooler 9, with an additional fan, if necessary. After the afterburner/combustion chamber 10, the combustion gases are expanded in a first turbine 2 and then in a second turbine 4 after the first one. Subsequently to the second turbine 4, the heat of the combustion gases is utilized in a feed water vaporizer 15. After this the combustion gases are directed to a precooling heat exchanger 5, after which water vapour formed in the combustion is condensed and is separated from the rest of the combustion gas flow. At the same time also water vapour in a closed circulation is condensed. The mass flow of water formed by these is pressurized to a pressure level slightly exceeding that of the afterburner/combustion chamber 10 by means of a pump 14. After this, the water vapour formed during combustion is separated from the rest of the water, as this water is conducted to the above mentioned feed water vaporizer 15 and further to the afterburner/combustion chamber 10, or the exhaust manifold. After the precooling heat exchanger 5, the remaining portion of the combustion gases is conducted to the combustion gas compressor 6. Subsequently, the combustion gases are cooled in the intercooler 16 and pressurized to atmospheric pressure in the second combustion gas compressor 6b. This latter combustion gas compressor 6b is connected/shafted to the first turbine 2 and the second turbine 4 is connected by a shaft to the combustion gas compressor 6, which is the most natural solution. The net work of each shaft is positive, so a first generator 3 and a second generator 17 are connected to them. At least one of these can act as an electric motor when necessary, such as during startup. Processing or possible renewing of feed water is not shown in the figure for the sake of clarity. An inverter and a battery is also omitted from the figures for the sake of clarity as they are related to the electrical side of the system.

Figure 2:
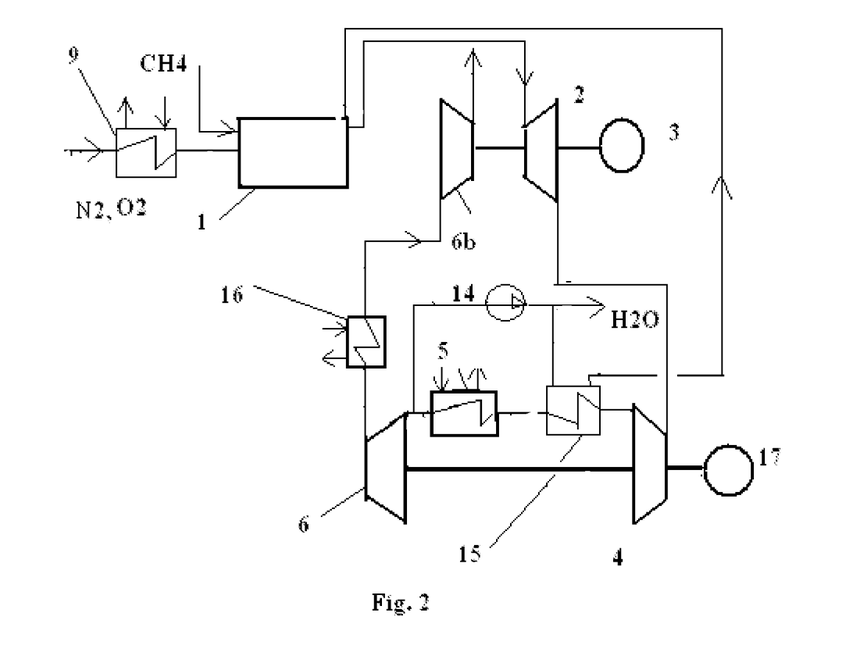
FIG. 2 illustrates another embodiment of invention in which there is no afterburner/combustion chamber.

FIG. 2 differs from the apparatus of FIG. 1 in that the combustion gases are not heated in the afterburner/combustion chamber 10, i.e. it is not provided. Instead water is introduced into the exhaust manifold of the internal combustion engine 1. Due to this, the average operation temperature of the turbines is lower than in the example of FIG. 1, even if the exit temperature of the second turbine 4 were chosen to be the same. This would mean a lower total pressure ratio of the turbine, but on the other hand no added fuel is used.

In a process according to FIG. 3 the combustion gases arriving from the internal combustion engine are directed to the first turbine 2, subsequent to which there is a second turbine 4, in which the combustion gases continue to expand to a pressure at least partly below the atmospheric pressure—typically to a pressure of about 0.45 to 0.2 bar—or even lower. This second turbine 4 is in fact a turbine-compressor combination, i.e. the combustion gas compressor 6 (which pressurizes combustion gases coming from heat exchanger 5) is connected to it (by a shaft), and the second combustion gas compressor 6b pressurizes combustion gases back to atmospheric pressure. Prior to this the combustion gases have been cooled by means of a precooling heat exchanger 5 to near the temperature of the cooling medium—typically air or water. Thus this cooling is effected in the precooling heat exchanger 5 so that the cooling medium is introduced into the precooling heat exchanger 5 and exits therefrom after the heat exchange. At the same time the water vapour formed in the combustion is condensed from the combustion gases and it is also removed from the process before the first combustion gas compressor 6. Water is finally removed, naturally at atmospheric pressure, but for clarity the presentation method is chosen to correspond with that of FIG. 1. Generator 3 is connected to the first turbine 2 and the second generator 17 is connected to the second turbine 4, as the net work of both shafts is positive. The second turbine is connected by a shaft to the combustion gas compressor 6. An intercooler 16 is arranged between the combustion gas compressor 6 and the second combustion gas compressor 6b. The produced electricity can be utilized in. e.g. a hybrid car. The heat from the combustion gas compressors can naturally also be utilized, if necessary. This is primarily possible in engine power plants. Similarly the excess heat of the precooling heat exchanger 5 can also be utilized.

Figure 3:
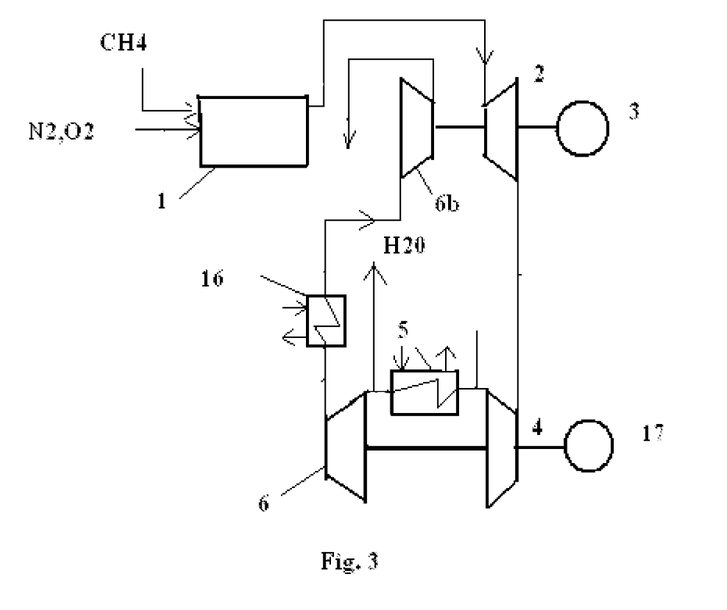
FIG. 3 illustrates an embodiment of the invention in which the amount of water introduced into the exhaust manifold is zero.

Table 1 illustrates the values of the state points of FIG. 3. All example calculations are shown to only demonstrate the invention and the values can naturally vary. The fuel chosen for the example is methane, which is used in the other figures as well. The values of table 1 correspond to a system in which the valve timing is utilized, by means of which a bigger expansion ratio is achieved in relation to the compression ratio. The values of the table increase by about 25% the power of an internal combustion engine with valve timing, having an already high efficiency, and the total efficiency is about 52% to 53%. This advanced version differs from the current ETC systems or valve timing in that currently, the efficiency of the engine is increased either by means of an ETC system or valve timing, but in practice not by a simultaneous use of both.

The exhaust valve temperature of about 700 degrees Celsius used in the table is realistic, because Formula 1 cars use a corresponding temperature of about 800 degrees C. Compared to previous figures, the heat exchanger 7 is not present in this figure, because heat is not utilized at the end of the second combustion gas compressor 6b. Such a construction is well suitable for many applications, such as an internal combustion engine with non-compressed inlet air or compressed and intercooled inlet air. A normal otto engine or a diesel engine is also well suitable and it is a very good power source for a hybrid car.

Figure 4:
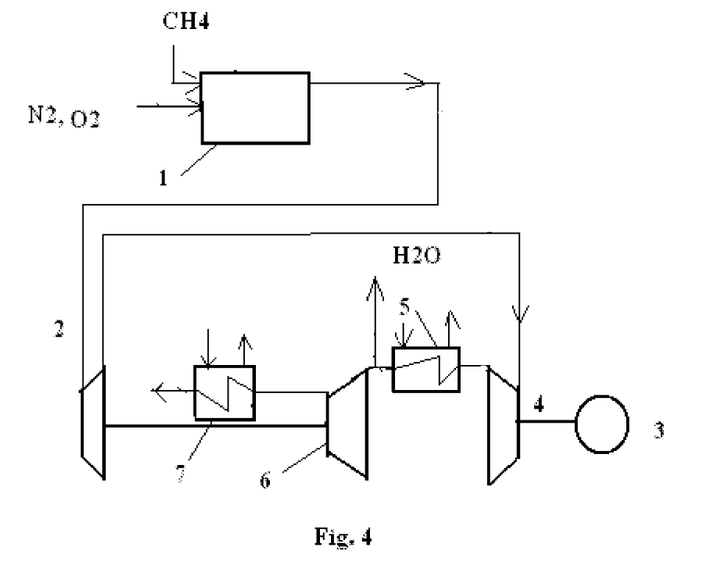
FIG. 4 illustrates an embodiment in which power is taken from a second turbine and the combustion gas compressor is single-piece unit.

FIG. 4 shows an embodiment in which the first turbine 2 is connected to the combustion gas compressor 6 and the second turbine 4 produces power to the generator 3. The combustion gas compressor is a single piece unit and the process does not have water injection to the exhaust manifold of the internal combustion engine. Table 3 illustrates the values of the state points of FIG. 4.

TABLE 3

| | p (bar) | T (K) | h(N2) kJ/kg | h(O2) kJ/kg | h(CO2) kJ/kg | h(H2O) kJ/kg |
|---|---|---|---|---|---|---|
| 21 | 1.0 | 288 | 15.6 | 12.6 | | |
| 22 | 1.345 | 980.1 | 769.4 | 711.3 | 756.3 | 3942 |
| 23 | 0.538 | 812.7 | 577.7 | 531.6 | 554.4 | 3569 |
| 24 | 0.224 | 675.3 | 428 | 388.6 | 397.1 | 3277 |
| 25 | 0.221 | 313.0 | | | | |
| 26 | 0.221 | 313.0 | 41.6 | 35.8 | 36 | |
| 27 | 0.221 | 313.0 | 41.6 | 35.8 | 36 | |
| 28 | 1.03 | 514.9 | 253 | 228 | 224 | |
| 29 | 1.0 | | | | | |

Figure 5:
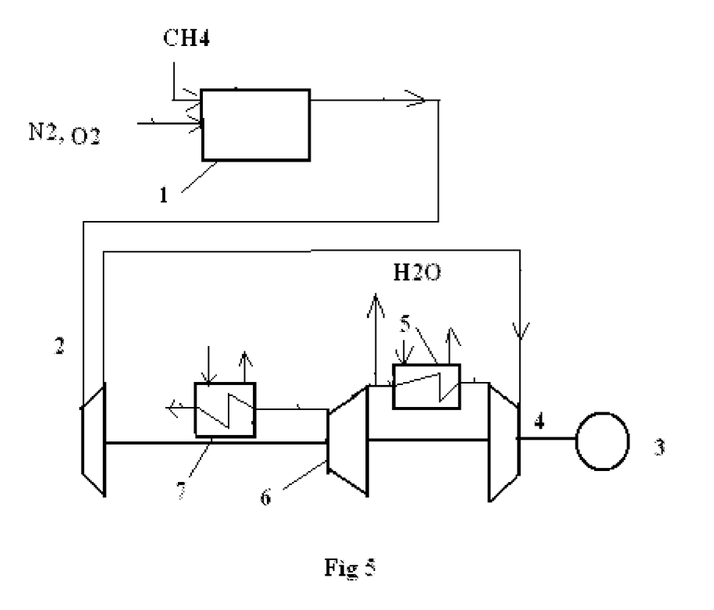
FIG. 5 illustrates an embodiment in which a combustion gas compressor, a first and a second turbine are on the same shaft.

FIG. 5 shows another embodiment where the single-part combustion gas compressor 6, first turbine 2 and second turbine 4 are on the same shaft. The combustion gas compressor 6 is a single-part one.

Figure 6:
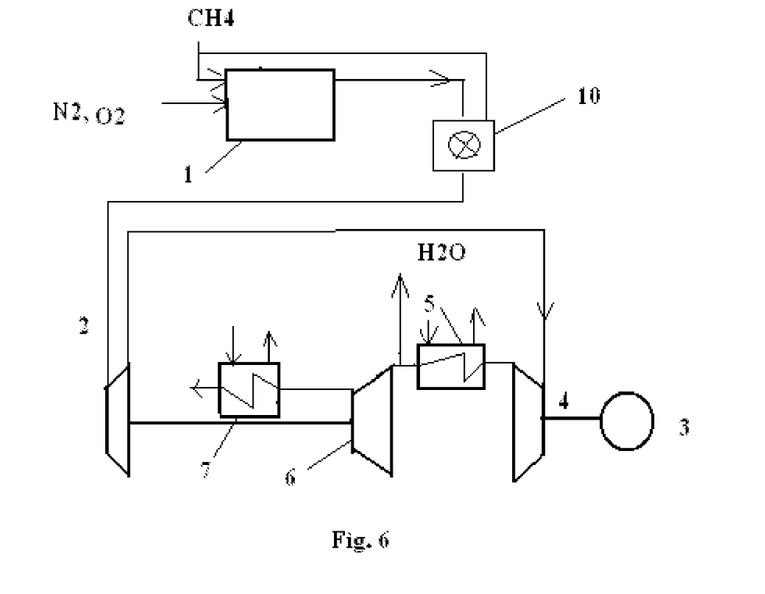
FIG. 6 illustrates another embodiment of the invention in which there is an additional combustion in the combustion chamber subsequent to the internal combustion engine.

In the embodiment according to FIG. 6 there is an additional combustion provided in combustion chamber 19 subsequent to the internal combustion engine 1. It would be useful if the additional combustion took place in the cylinders of the internal combustion engine 1, but the durability of the valves in the cylinder head of the engine is a limiting factor. Combustion air is not necessarily compressed in the example of FIG. 6, even though it would lead to a higher pressure ratio of the turbine and a better total efficiency, however the temperature after the combustion chamber 10 is chosen not to require cooling of the vanes of the first turbine 2. Cooling would considerably increase costs. It is however possible to use a combustion air compressor 8, whereby the pressure of the combustion gases after the internal combustion engine 1 would be higher, in the range 2-3 bar.

Figure 7:
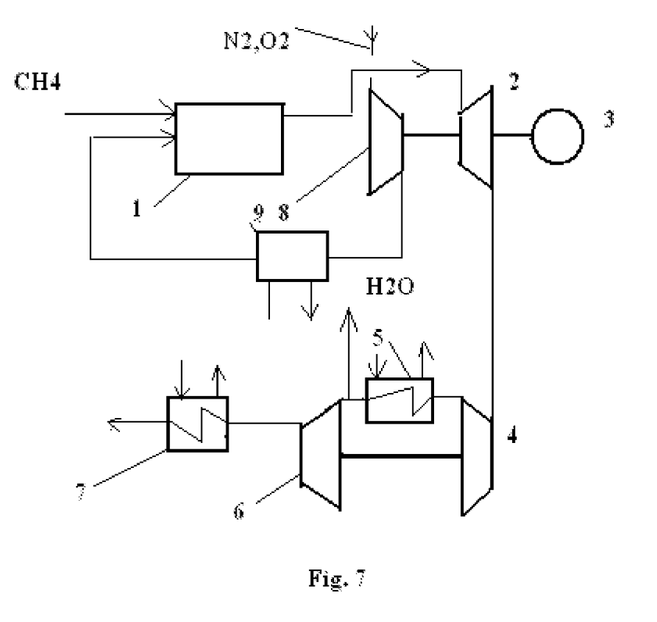
FIG. 7 illustrates an embodiment in which the combustion air is compressed.

In a process according to FIG. 7 the air being introduced into the otto engine 1 is compressed. For this purpose, the process comprises a combustion air compressor 8 and an inlet air intercooler 9. In this construction the combustion air compressor 8 is on the same shaft with the first turbine 2, but it may also be combined to the shaft of a second turbine 4—combustion gas compressor 6 combination. From the internal combustion engine 1 the combustion gases are directed to the first turbine 2. Excess power is utilized in generator 3. A second turbine 4 follows the first turbine 2. This second turbine is also a turbine-compressor combination, i.e. a combustion gas compressor 6 is connected thereto by a shaft). The combustion gas compressor 6 mentioned earlier compresses combustion gases back to atmospheric pressure. Prior to this the combustion gases have been cooled by means of a precooling heat exchanger 5 to near the temperature of the cooling medium—typically air or water. Thus this cooling is effected in the precooling heat exchanger 5 so that the cooling medium is introduced into the precooling heat exchanger 5 and exits therefrom after the heat exchange. At the same time the water vapour formed in combustion is condensed and also removed from the process before the combustion gas compressor 6. Water is naturally finally removed to atmospheric pressure at the end, but for clarity the presentation method is chosen to correspond with that of the figure. The heat from the combustion gas compressor 6 can naturally also be utilized, if necessary. This is shown in figure by using the heat exchanger 7. This is primarily a possibility in motor power plants. Similarly the heat of the precooling heat exchanger 5 and the intercooler 9 can also be utilized. Combustion air can naturally also be compressed by means of a mechanical compressor, a so-called supercharger, or by means of an electric compressor.

Figure 8:
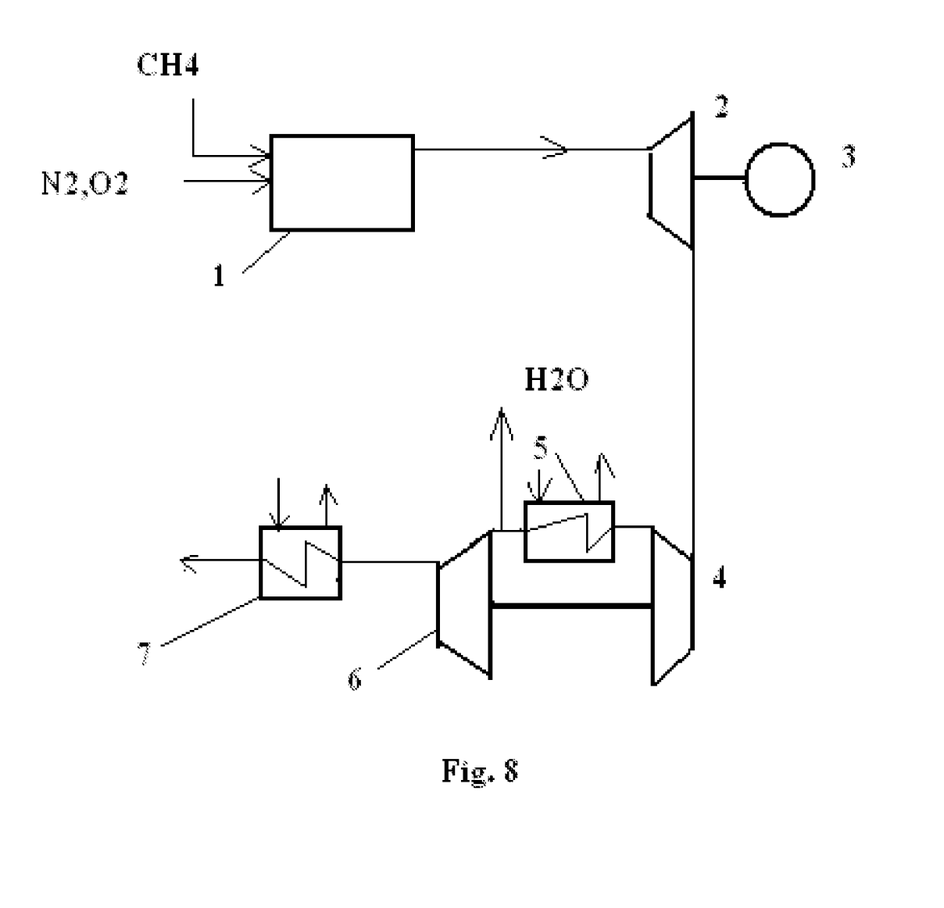
FIG. 8 illustrates yet another embodiment in which a generator is connected to a first turbine.

In FIG. 8 the generator 3 is connected to the first turbine 2 and the combustion gas compressor 6 is a single-part one.

The invention allows achieving many advantages compared to current solutions. The very high efficiency is, naturally, the most important one. Also the combustion of the internal combustion engine 1 can be improved by introducing more fuel into the internal combustion engine 1 than is now possible, because there is no need to fear the increase of combustion gas temperature. The fuel can be introduced, for example, utilizing the phased combustion principle or right at the start of the combustion as a larger mass low. Current technology can also be applied for the startup and shut down procedures, as well as for the shaft connections of the compressors and turbines. Immediately after startup, an intermediate port may open to atmospheric pressure in the turbine, the until the temperature of the combustion gases is sufficient. In the figures there can be an intermediate port to the combustion gas compressor after the first turbine 2. Of course, the combustion gases must first be cooled. The on/off intermediate port mentioned in the claims can be, for example, pressure regulated.

The temperature of the turbine vanes is so low that usually there is no need for cooling the vanes, but it will be also possible, of course. Two or more fuels can also be used as heat source, if necessary.

Water can also be injected into the cylinder without departing from the scope of the invention, which reduces the power requirement of the compression stroke. Preheated water is usually used and the process includes many heat sources by means of which this can be achieved. Valve timing can also be selected as desired. Axial bearing forces can also be minimized by placing the turbines and compressors as desired. In EGR systems, a portion of combustion gases is recirculated into the cylinder for reducing harmful substances, and use of these techniques in the context of this invention is not necessary or essential, but parallel use is by no means excluded, and therefore also claimed. A catalysator can also be installed anywhere in the combustion gas circulation for cleaning out harmful substances. The abovementioned water injection can be carried out by e.g. utilizing the water vapour formed in combustion and then condensed. It is known that water injection reduces nitrogen oxide emissions, but other currently used methods can also be used for that purpose.

Other features used in current ETC systems or hybrid cars can also be utilized in an apparatus according to the invention, such as brake energy recovery, pressure regulated wastegate, variable nozzle etc. There can also be additional ports in the internal combustion engine 1 for flow control. As plenty of waste heat is generated in the process, keeping the battery warm in hybrid cars in the winter is not a problem. The water formed in combustion can be removed from the process in gaseous form by introducing condensed and separated water in liquid form to the rest of the combustion gas flow after pressurizing. Of course, it is not necessary to separate it at all after condensing, if not desired.

The invention is also suitable for use in future high compression ratio otto engines. An opposed piston motor application is also possible. Current hybrids are so-called series or parallel hybrids. A combination of these is also possible. In such a construction the power from the internal combustion engine goes simultaneously to the wheels and to a generator charging the batteries, and the produced electricity is utilized in the electric motor. In urban driving—when the internal combustion engine is off—the generator can be used as a motor if a suitable switch connection exist, for example a so-called double switch. A thermo-element can also be attached to the combustion gas flow in all embodiments of the invention, if necessary. For example after or before the second turbine 4, after or before the first turbine 2, or after the combustion gas compressor.

In hybrid cars one possible version is such that the internal combustion engine runs during part of the driving, charging the battery, and the internal combustion engine is switched off for a part of the time. In this application the electric motor is the power source of the car, In addition to this series hybrid a parallel hybrid is also possible.

Naturally different ETC applications can also be applied to this invention, including a "dual" ETC. FIG. 3 shows a dual ETC application, where two turbines are separated and each is coupled to its own electric generator.

Promising embodiments of the invention, mentioned here by way of examples, include marine applications and hybrid car applications with valve timing.

The embodiment examples are disclosed only to clarify the invention and they do not limit the scope of the invention in any way because details, such as water removal, water processing and other details not necessary for understanding the invention have been omitted for reasons of clarity. For example, in some embodiments all components may not be needed. Thus the invention is not limited to the disclosed embodiments but it includes all that is within the scope of the appended claims.

I claim:

1. A method for utilizing the waste heat of combustion gases of an internal combustion engine, comprising:
    directing the combustion gases to a first inverted Brayton cycle turbine, a subsequent second inverted Brayton cycle turbine, and a precooling heat exchanger with water separation,
    expanding the combustion gases formed as a result of the combustion of air and fuel in a cylinder of the internal combustion engine according to an Electric Turbo Compounding (ETC) system after the first turbine to a pressure of less than 0.45 bar in the second turbine,
    pressurizing the combustion gases from the precooling heat exchanger to atmospheric pressure by a two-stage combustion gas compressor formed of a combustion gas compressor and a second combustion gas compressor,
wherein:
    the first turbine is connected by a shaft to the second combustion gas compressor and the second turbine is connected by another shaft to said combustion gas compressor, and
    an intercooler is located between said combustion gas compressor and said second combustion gas compressor.

2. The method according to claim 1, wherein 0-100% of water vapor formed during combustion is removed from the process prior to said combustion gas compressor.

3. The method according to claim 1, wherein fuel is introduced into the cylinder of the internal combustion engine in one or more stages.

4. The method according to claim 1, wherein a first generator is connected to the first turbine and/or a second generator is connected to the second turbine, electricity produced by which is utilized in a hybrid car, as a power source of a ship or in production of electricity.

5. The method according to claim 1, wherein before the first turbine there is an additional combustion of combustion gases effected in the cylinder of the internal combustion engine or in an afterburner/combustion chamber.

6. The method according to claim 1, wherein the temperature of the combustion gases from the internal combustion engine is adjusted by means of valve timing of the internal combustion engine.

7. The method according to claim 1, wherein there is an on/off port of 1 atm pressure in a combustion gas channel.

8. The method according to claim 1, wherein a battery is used for storing energy.

9. The method according to claim 1, wherein the internal combustion engine is an otto or diesel engine.

10. The method according to claim 1, wherein a feed water vaporizer is located between the second turbine and said precooling heat exchanger, whereby feed water is vaporized in said feed water vaporizer and introduced into an exhaust manifold of the internal combustion engine.

11. The method according to claim 10, wherein heat between the precooling heat exchanger and the second turbine is utilized in a water vapor circulation process.

12. The method according to claim 10, wherein a pump is used for feeding water to the feed water vaporizer.

13. An apparatus for utilizing the waste heat of an internal combustion engine, the apparatus having a combustion gas circulation system comprising:
    a first inverted Brayton cycle turbine for receiving combustion gases from the internal combustion engine;
    a second inverted Brayton cycle turbine for receiving combustion gases from said first turbine;

a precooling heat exchanger for receiving combustion gases from said second turbine; and a combustion gas compressor for receiving combustion gases from said precooling heat exchanger, wherein:

the combustion gases formed as a result of combustion of air and fuel in a cylinder of the internal combustion engine according to an Electric Turbo Compounding (ETC) system are expanded after the first turbine in the second turbine to a pressure below 0.45 bar, whereby the combustion gases are pressurized back to atmospheric pressure by a two-stage combustion gas compressor formed of the combustion gas compressor and a second combustion gas compressor, the first turbine is connected by a shaft to the second combustion gas compressor and the second turbine is connected by another shaft to said combustion gas compressor, and an intercooler is located between said combustion gas compressor and said second combustion gas compressor.

14. The apparatus according to claim 13, wherein heat from at least one of: the precooling heat exchanger and a heat exchanger after said combustion gas compressor is utilized for district heating.

15. The apparatus according to claim 13, wherein the precooling heat exchanger is provided with water separation for removing 0-100% of water vapor formed during combustion from the process prior to said combustion gas compressor.

16. The apparatus according to claim 13, wherein it comprises a first generator connected to the first turbine and/or a second generator connected to the second turbine, electricity produced by which is utilized in a hybrid car, as a power source of a ship or in production of electricity.

17. The apparatus according to claim 13, wherein the apparatus comprises an afterburner or combustion chamber before the first turbine for effecting an additional combustion of combustion gases coming from the engine.

18. The apparatus according to claim 13, further comprising a water vapor circulation process for utilizing heat between the precooling heat exchanger and the second turbine.

19. The apparatus according to claim 13, wherein there is an on/off port of 1 atm pressure in a combustion gas channel.

20. The apparatus according to claim 13, further comprising a battery for storing electric energy.

21. The apparatus according to claim 13, wherein the internal combustion engine is an otto or diesel engine.

22. The apparatus according to claim 13, wherein the internal combustion engine is provided with a mechanical or electrical compressor not using combustion gases for compressing air.

23. The apparatus according to claim 22, wherein the mechanical or electrical compressor is provided with inlet air intercooling.

24. The apparatus according to claim 13, wherein a feed water vaporizer is located between the second turbine and said precooling heat exchanger, wherein said feed water vaporizer is arranged to receive combustion gases from said second turbine and to introduce water into an exhaust manifold of the internal combustion engine.

25. The apparatus according to claim 24, further comprising a pump for feeding water to the feed water vaporizer.

* * * * *